United States Patent
Sakaba et al.

(10) Patent No.: US 11,875,217 B2
(45) Date of Patent: Jan. 16, 2024

(54) INFORMATION PROCESSING APPARATUS, INFORMATION PROCESSING TERMINAL APPARATUS, AND INFORMATION PROCESSING METHOD

(71) Applicant: SONY GROUP CORPORATION, Tokyo (JP)

(72) Inventors: Koji Sakaba, Kanagawa (JP); Tsutomu Nakatsuru, Tokyo (JP); Yuki Suzuki, Tokyo (JP); Masatsugu Ishiko, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 202 days.

(21) Appl. No.: 17/430,952

(22) PCT Filed: Jan. 15, 2020

(86) PCT No.: PCT/JP2020/000993
§ 371 (c)(1),
(2) Date: Aug. 13, 2021

(87) PCT Pub. No.: WO2020/179230
PCT Pub. Date: Sep. 10, 2020

(65) Prior Publication Data
US 2022/0147725 A1 May 12, 2022

(30) Foreign Application Priority Data
Mar. 6, 2019 (JP) .................... 2019-040340

(51) Int. Cl.
*G06K 7/10* (2006.01)
(52) U.S. Cl.
CPC ................. *G06K 7/10366* (2013.01)

(58) Field of Classification Search
CPC ............ G06K 7/10366; G06F 11/1443; H04L 67/125
(Continued)

(56) References Cited

U.S. PATENT DOCUMENTS

2016/0179607 A1* 6/2016 Kulkarni ............. G06F 11/0751
714/4.21
2018/0077520 A1  3/2018 Kwan

FOREIGN PATENT DOCUMENTS

| EP | 0841777 A2 | 5/1998 |
| JP | 2000048141 A | 2/2000 |

(Continued)

*Primary Examiner* — Jamara A Franklin
(74) *Attorney, Agent, or Firm* — Paratus Law Group, PLLC

(57) ABSTRACT

An information processing apparatus generates a command for a communication terminal apparatus and a retry command and successively outputs the generated command and retry command to an information processing terminal apparatus. The information processing terminal apparatus acquires the command for the communication terminal apparatus and the retry command that have successively been output from the information processing apparatus and outputs the acquired command to the communication terminal apparatus. Further, in a case of performing a retry process due to unavailability of a response to the command, the information processing terminal apparatus outputs the acquired retry command to the communication terminal apparatus. The retry process can be performed without waiting for the information processing terminal apparatus to output a command request to the information processing apparatus and acquire a retry command. Accordingly, a process between a communication terminal apparatus and an information processing apparatus via an information processing terminal apparatus can be performed efficiently.

13 Claims, 11 Drawing Sheets

(58) Field of Classification Search
USPC .................. 235/375, 451; 340/10.1–10.6,
340/572.1–572.9
See application file for complete search history.

(56) References Cited

FOREIGN PATENT DOCUMENTS

| | | |
|---|---|---|
| JP | 2004-186883 A | 7/2004 |
| JP | 2006-099641 A | 4/2006 |
| JP | 2007-080083 A | 3/2007 |
| JP | 2011-065471 A | 3/2011 |
| JP | 2012-118949 A | 6/2012 |

* cited by examiner

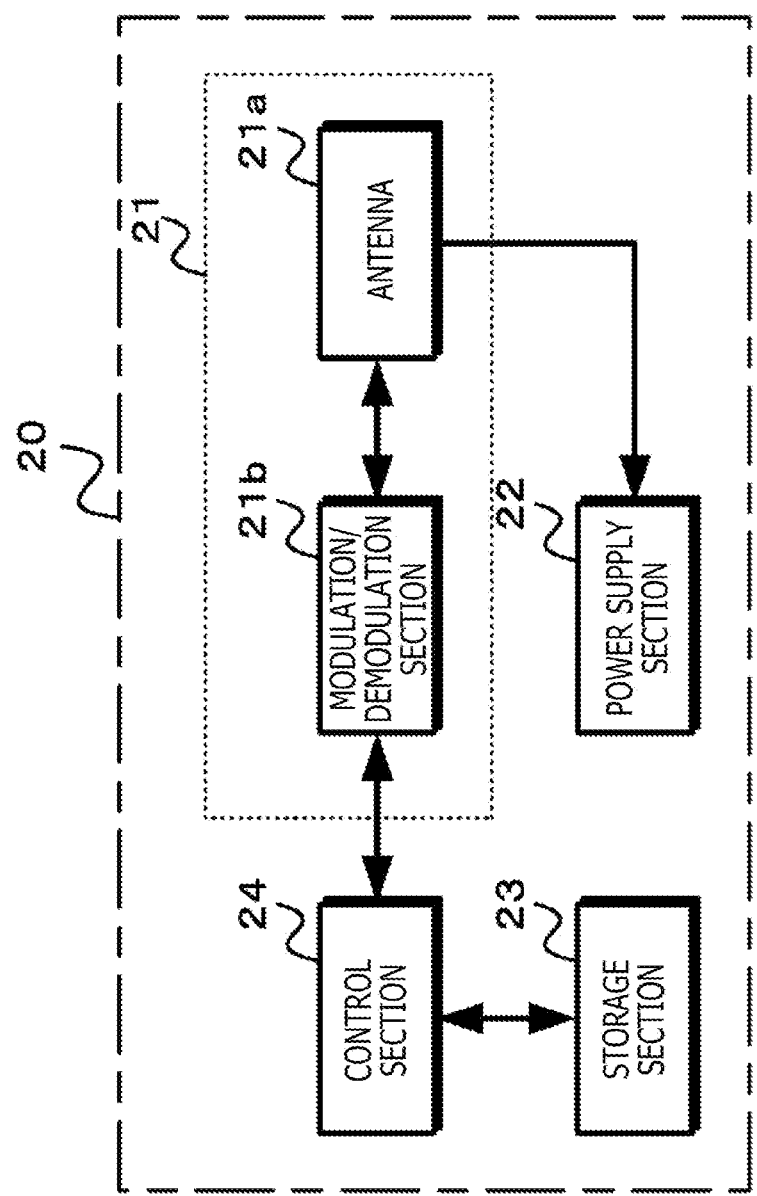
F I G . 2

| Read | SEQUENCE NUMBER (1) | COMAMND DATA |
|---|---|---|
| Read | SEQUENCE NUMBER (3) | COMAMND DATA |
| Read | SEQUENCE NUMBER (5) | COMAMND DATA |

(b)

| Write | SEQUENCE NUMBER (1) | COMAMND DATA |
|---|---|---|
| Read | SEQUENCE NUMBER (3) | COMAMND DATA |
| EXPECTED VALUE OF RESPONSE (OR HASH VALUE OF EXPECTED VALUE) | | |
| Write | SEQUENCE NUMBER (5) | COMAMND DATA |

INFORMATION PROCESSING APPARATUS, INFORMATION PROCESSING TERMINAL APPARATUS, AND INFORMATION PROCESSING METHOD

CROSS REFERENCE TO PRIOR APPLICATION

This application is a National Stage Patent Application of PCT International Patent Application No. PCT/JP2020/000993 (filed on Jan. 15, 2020) under 35 U.S.C. § 371, which claims priority to Japanese Patent Application No. 2019-040340 (filed on Mar. 6, 2019), which are all hereby incorporated by reference in their entirety.

TECHNICAL FIELD

The present technology relates to an information processing apparatus, an information processing terminal apparatus, and an information processing method and enables efficient performance of a process between a communication terminal apparatus and an information processing apparatus via an information processing terminal apparatus.

BACKGROUND ART

In a conventional information processing system, in a case where commands and responses are transmitted and received between a server and a client, such transmission and reception are performed for each command or response. As such, in a case where an error occurs in the server and the client, the server transmits a command again. Thus, in order to realize secure and efficient communication of information, PTL 1 discloses a technology in which an information processing terminal apparatus makes a request to an information processing apparatus for establishment of communication via a network and performs control on the basis of a command included in a packet supplied from the information processing apparatus through the communication established in response to the request. Further, the information processing apparatus establishes communication with the information processing terminal apparatus via the network in response to the request from the information processing terminal apparatus, and transmits, to the information processing terminal apparatus, a packet including a command, when communication is established.

CITATION LIST

Patent Literature

[PTL 1]
Japanese Patent Laid-open No. 2004-186883

SUMMARY

Technical Problem

Incidentally, in a case where short-range wireless communication is used for establishment of communication via the network, communication may be disrupted if the communication environment changes after the communication is established. For example, in a case where a reader/writer is provided between an information processing apparatus and an information processing terminal apparatus and short-range wireless communication is to be performed between the information processing terminal apparatus and the reader/writer, if the information processing terminal apparatus moves away from the reader/writer, communication cannot be performed between the information processing apparatus and the information processing terminal apparatus. In such a case, the reader/writer needs to acquire a retry command for performing a retry process from the information processing apparatus, taking time for the retry process.

As such, the present technology aims to provide an information processing apparatus, an information processing terminal apparatus, and an information processing method that enable efficient performance of a process between a communication terminal apparatus and an information processing apparatus via an information processing terminal apparatus.

Solution to Problem

The first aspect of the present technology lies in an information processing apparatus including a command generation section configured to generate a command for a communication terminal apparatus and a retry command and output the generated retry command together with the command.

According to the present technology, the command generation section generates a command for the communication terminal apparatus and a retry command that is based on whether or not the command is a command that has idempotence, and outputs the generated retry command together with the command. In a case where the command for the communication terminal apparatus is a command that has idempotence, the command generation section generates a retry command by repeating the command that has idempotence. Further, in a case where the command for the communication terminal apparatus is a command that does not have idempotence, the command generation section generates, as the retry command, a command for checking a state of the communication terminal apparatus. Further, in a case where a response to be output from the communication terminal apparatus in response to a command is to be encrypted, the command generation section calculates an expected value of the response or a hash value of the expected value and outputs the calculated expected value or the calculated hash value together with the command and the retry command. Furthermore, the command generation section sets a sequence number indicating an order of processing, for the command and the retry command.

In a case where the number of retry commands is to be adjusted based on the number of retries or a state of occurrence of retries, the command generation section determines the number of retries or the state of occurrence of retries on the basis of the sequence number of the command and a sequence number of a response output from the communication terminal apparatus.

The second aspect of the present technology lies in an information processing method including generating a command for a communication terminal apparatus and a retry command and outputting, from a command generation section, the retry command together with the command.

The third aspect of the present technology lies in an information processing terminal apparatus including a command control section configured to acquire a command for a communication terminal apparatus and a retry command that are successively output from an information processing apparatus, to output the command acquired to the communication terminal apparatus, and to output, in a retry process, the acquired retry command to the communication terminal apparatus.

According to the present technology, the information processing terminal apparatus includes a communication section that performs short-range wireless communication with the communication terminal apparatus, and the command control section outputs a command or a retry command through the communication section. The command control section acquires the command for the communication terminal apparatus and the retry command that have successively been output from the information processing apparatus and outputs the acquired command to the communication terminal apparatus. Further, in a case where a response cannot be acquired from the communication terminal apparatus, the information processing terminal apparatus performs a retry process and outputs the acquired retry command to the communication terminal apparatus in the retry process. The command control section outputs, to the information processing apparatus, a response output from the communication terminal apparatus. Further, the command control section acquires a command, a retry command, and an expected value of a response to the command or a hash value of the expected value, and outputs, in a case where the acquired expected value or the acquired hash value of the expected value matches an expected value that is based on a response output from the communication terminal apparatus or a hash value of the expected value, the response to the information processing apparatus.

The fourth aspect of the present technology lies in an information processing method including acquiring a command for a communication terminal apparatus and a retry command that are output from an information processing apparatus, outputting the command acquired to the communication terminal apparatus, and outputting, in a retry process, the acquired retry command to the communication terminal apparatus from a command control section.

BRIEF DESCRIPTION OF DRAWINGS

FIG. 2 is a diagram exemplifying a configuration of a communication terminal apparatus (in a case of a contactless IC card).

FIG. 8 depicts diagrams exemplifying idempotent commands and non-idempotent commands.

DESCRIPTION OF EMBODIMENT

A mode for carrying out the present technology will be described below. Note that the description will be given in the following order.

1. Configuration of Information Processing System
2. First Operation of Information Processing System
3. Second Operation of Information Processing System
4. Other Operation of Information Processing System <1. Configuration of Information Processing System>

Figure 1:
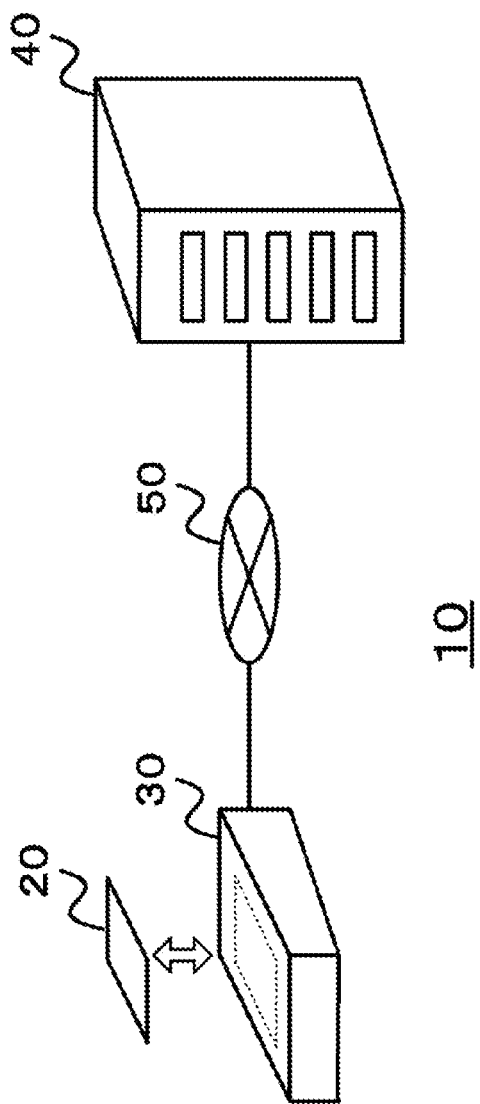
FIG. 1 is a diagram illustrating a configuration of an information processing system.

FIG. 1 depicts a configuration of an information processing system in which an information processing apparatus according to the present technology is used. An information processing system 10 includes a communication terminal apparatus 20, an information processing terminal apparatus 30, and an information processing apparatus (for example, a server) 40. The information processing apparatus 40 reads out information from the communication terminal apparatus 20 or writes information into the communication terminal apparatus 20, via the information processing terminal apparatus 30. In addition, the information processing terminal apparatus 30 performs wireless communication with the communication terminal apparatus 20.

The communication terminal apparatus 20 includes at least a function for performing wireless communication with the information processing terminal apparatus 30. For example, the communication terminal apparatus 20 is a mobile electronic device such as a contactless IC card and a smartphone or an IOT (Internet of Things) device or the like. Note that, in the following description, using the communication terminal apparatus 20 as a contactless IC card and the information processing terminal apparatus 30 as a reader/writer, a case of performing short-range wireless communication between the contactless IC card and the reader/writer will be explained.

FIG. 2 exemplifies a configuration of the communication terminal apparatus (in the case of a contactless IC card). The communication terminal apparatus 20 includes a communication section 21, a power supply section 22, a storage section 23, and a control section 24.

The communication section 21 includes an antenna 21*a* and a modulation/demodulation section 21*b* in order to implement short-range wireless communication with the information processing terminal apparatus 30. The antenna 21*a* is used for transmission of information and the like or supply and reception of electric power, by being coupled to the information processing terminal apparatus 30 by electromagnetic induction, and is connected to the modulation/demodulation section 21*b* and the power supply section 22.

The modulation/demodulation section 21*b* outputs, to the control section 24, a reception signal obtained by demodulating a wireless signal received by the antenna 21*a*. Further, the modulation/demodulation section 21*b* modulates a transmission signal supplied from the control section 24 and transmits the modulated signal from the antenna 21*a* as a wireless signal.

The power supply section 22 converts an alternating voltage generated in the antenna 21*a* as a result of being coupled to the information processing terminal apparatus 30 by electromagnetic induction into a direct constant voltage and supplies electric power to the modulation/demodulation section 21*b*, the storage section 23, and the control section 24.

The storage section 23 stores therein various kinds of information. For example, the storage section 23 stores therein information specific to a user of a communication terminal apparatus, information supplied from an information processing apparatus, and the like.

The control section 24 processes a command indicated by the reception signal and, for example, reads out the information stored in the storage section 23 or writes in information to the storage section 23. Further, the control section 24 generates a transmission signal indicating a response to the received command and outputs the signal to the modulation/demodulation section 21b. Furthermore, the control section 24 decodes an encrypted command and encrypts a response.

Figure 3:
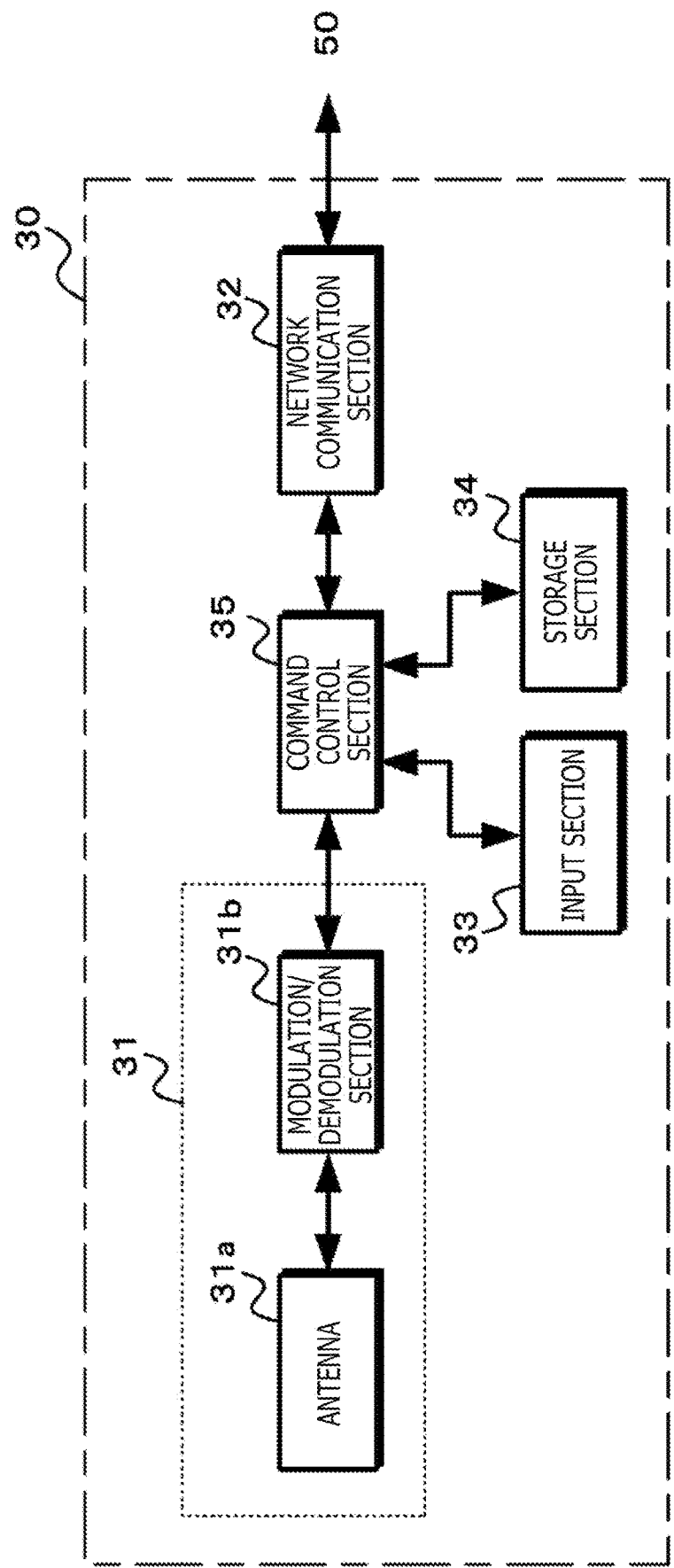
FIG. 3 is a diagram exemplifying a configuration of an information processing terminal apparatus.

FIG. 3 exemplifies a configuration of the information processing terminal apparatus. The information processing terminal apparatus 30 includes a communication section 31, a network communication section 32, an input section 33, a storage section 34, and a command control section 35.

The communication section 31 includes an antenna 31a and a modulation/demodulation section 31b in order to implement short-range wireless communication with the communication terminal apparatus 20. The antenna 31a is used for transmission of information and the like or supply and reception of electric power, by being coupled to the communication terminal apparatus 20 by electromagnetic induction, and is connected to the network communication section 32. The modulation/demodulation section 31b modulates a command or a retry command supplied from the command control section 35, and transmits the modulated command from the antenna 31a as a wireless signal. In addition, the modulation/demodulation section 31b outputs, to the command control section 35, a reception signal obtained by demodulating a wireless signal received by the antenna 31a.

The network communication section 32 is used to connect the information processing terminal apparatus 30 to a network 50. The network communication section 32 outputs, to the command control section 35, a command or the like supplied from the information processing apparatus 40 via the network 50. Further, the network communication section 32 outputs, to the information processing apparatus 40 via the network 50, a response or the like output from the command control section 35.

The input section 33 has a function of receiving input of operation by a user. The input section 33 includes an operation button, a touch panel, a keyboard, a microphone, or the like. The input section 33 generates an operation signal based on a user operation and outputs the signal to the command control section 35.

The storage section 34 may include a semiconductor memory such as a ROM or a RAM or may include a magnetic recording device, an optical recording device, a magnetooptical recording device, or the like. The storage section 34 stores therein programs for operating the information processing terminal apparatus 30 and various kinds of data. Further, the storage section 34 also stores therein a retry command, an expected value of a response, and the like supplied from the information processing apparatus 40.

The command control section 35 executes the programs stored in the storage section 34, to control each section in such a manner that the information processing terminal apparatus 30 performs predetermined operation. Further, the command control section 35 controls, on the basis of the operation signal from the input section 33, each section in such a manner that the information processing terminal apparatus 30 performs operation based on a user operation. For example, the command control section 35 performs such processes as acquisition of a command or the like from the information processing apparatus 40, command output to and a retry process for the communication terminal apparatus 20, acquisition of a response or the like from the communication terminal apparatus 20, and output of a response to the information processing apparatus 40. Further, the command control section 35 acquires a command for the communication terminal apparatus and a retry command that are output from the information processing apparatus, outputs the acquired command to the communication terminal apparatus, and outputs, in the retry process, the acquired retry command to the communication terminal apparatus.

Figure 4:
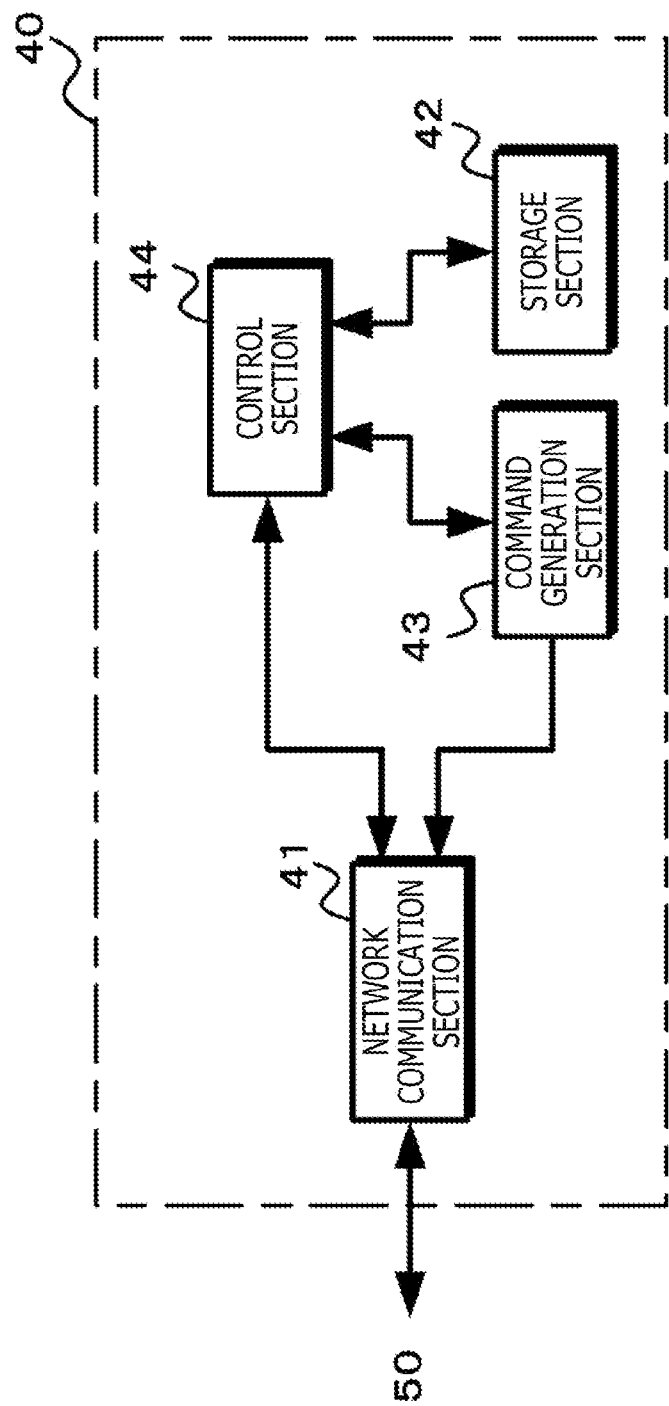
FIG. 4 is a diagram exemplifying a configuration of an information processing apparatus.

FIG. 4 exemplifies a configuration of the information processing apparatus. The information processing apparatus 40 includes a network communication section 41, a storage section 42, a command generation section 43, and a control section 44.

The network communication section 41 is used to connect the information processing apparatus 40 to the network 50. The network communication section 41 outputs, to the control section 44, information supplied via the network. Further, the network communication section 41 outputs, to the information processing terminal apparatus 30 via the network, information supplied from the control section 44.

The storage section 42 is a database in which various kinds of information concerning users of each communication terminal apparatus and the like are stored. In addition, the storage section 42 may also store application programs to be executed by the information processing apparatus 40 and the like.

The command generation section 43 generates a command for the communication terminal apparatus and a retry command and has the generated retry command output from a communication section together with the command for the communication terminal apparatus. Further, the command generation section 43 may be provided with a security module. A security module is a module provided with an application having a security function (what is generally called a SAM: Secure Application Module). A security module performs, for example, authentication with the communication terminal apparatus 20, or encrypting of a command, decoding of a response, or the like for reading out or writing information from and into the communication terminal apparatus 20 with security ensured. In a case where a response to be output from the communication terminal apparatus 20 in response to a command is to be encrypted, the command generation section 43 may calculate an expected value of a response (which may otherwise be a hash value of the expected value; simply referred to as an expected value in the following description) and output, from the network communication section 41, the expected value together with the generated command and retry command. Further, the command generation section 43 sets a sequence number indicating an order of processing, for the command and retry command.

The control section 44 executes the application programs and the like recorded in the storage section 42, to perform such processes as update of information stored in the storage section 42, registration of information acquired via the network communication section 41 in the storage section 42, and reading-out of information from the storage section 42. Further, the control section 44 controls the command generation section 43 to generate a command or the like for performing such processes as reading out information from or writing information into the communication terminal apparatus 20 and to cause the network communication section 41 to output the generated command or the like.

<2. First Operation of Information Processing System>

Next, operation of the information processing system will be described. The information processing apparatus 40 performs polling by using the information processing terminal apparatus 30 and detects a communication terminal apparatus 20 that can perform short-range wireless communication with the information processing terminal apparatus 30. The information processing terminal apparatus 30 receives a polling response including manufacture ID (IDm), a manufacture parameter (PMm), and the like of the communication terminal apparatus 20 and outputs the polling response to the information processing apparatus 40. Note that, a maximum response time parameter is indicated by the manufacture parameter (PMm).

Thereafter, the information processing apparatus 40 performs mutual authentication with the communication terminal apparatus 20 that can perform short-range wireless communication with the information processing terminal apparatus 30 and transmits various kinds of commands to the communication terminal apparatus 20 via the information processing terminal apparatus 30 after the authentication.

Figure 5:
FIG. 5 is a diagram exemplifying a packet of a command to be output from an information processing apparatus 40.

FIG. 5 exemplifies a packet of a command to be output from the information processing apparatus 40. The command includes a command code, a sequence number, and command data. The command code indicates what kind of packet the packet of the command is. The sequence number is a value indicating the order of processing in the communication terminal apparatus 20 and the information processing apparatus 40.

The communication terminal apparatus 20 and the information processing apparatus 40 each increment the sequence number by "one" every time they perform a process. Thus, in a case where a command is output to the communication terminal apparatus 20 and the command is being processed in the communication terminal apparatus 20 but the information processing terminal apparatus 30 cannot receive a response, if a retry process is performed without incrementing the sequence number, a retry command would be ignored in the communication terminal apparatus 20 because the command processed and the retry command would have the same sequence number. Moreover, if a command is ignored in the communication terminal apparatus 20, it is difficult to determine whether the command has not reached the communication terminal apparatus 20 or the command is ignored by the communication terminal apparatus 20. Thus, in a case of transmitting the next command or a retry command, it is necessary to increment the sequence number in advance.

For example, in a case where a command with a sequence number "m" is processed in the communication terminal apparatus 20, the sequence number is updated to "m+1," and the sequence number of a response to the command with the sequence number "m" is set to "m+1." Here, if the command with the sequence number "m" is used in the retry process, the communication terminal apparatus 20 invalidates the retry command, since such sequence number is equal to or smaller than the updated sequence number "m+1" stored in the communication terminal apparatus 20. Thus, for the retry command, a sequence number of a value larger than that of the sequence number stored in the communication terminal apparatus 20, for example, "m+2," is set.

Incidentally, when a command has not reached the communication terminal apparatus 20, a response is not transmitted from the communication terminal apparatus 20. Further, there are cases where the response transmitted from the communication terminal apparatus 20 cannot be received by the information processing terminal apparatus 30. Thus, in a case where a response cannot be received even after a time-out value that is set on the basis of a maximum response time parameter indicated by a manufacture parameter (PMm) included in a polling response is exceeded, a retry process is performed as described above.

In the conventional retry process, the information processing terminal apparatus 30 needs to make a request for a command to the information processing apparatus 40, and the information processing apparatus 40 needs to cause the command generation section 43 to generate a command with the sequence number being updated, in response to the request from the information processing terminal apparatus 30, and output the generated command to the communication terminal apparatus 20 via the information processing terminal apparatus 30, taking time for the retry process.

As such, at the time of generating a command to be output to the communication terminal apparatus 20, the information processing apparatus 40 generates a command for a retry process that has an incremented sequence number and outputs the generated retry command to the information processing terminal apparatus 30 together with the command to be output to the communication terminal apparatus 20. Further, in a case of performing a retry process, the information processing terminal apparatus 30 outputs, without making a request for a command to the information processing apparatus 40, the retry process command which has already been supplied from the information processing apparatus 40, to the communication terminal apparatus 20.

Figure 6:
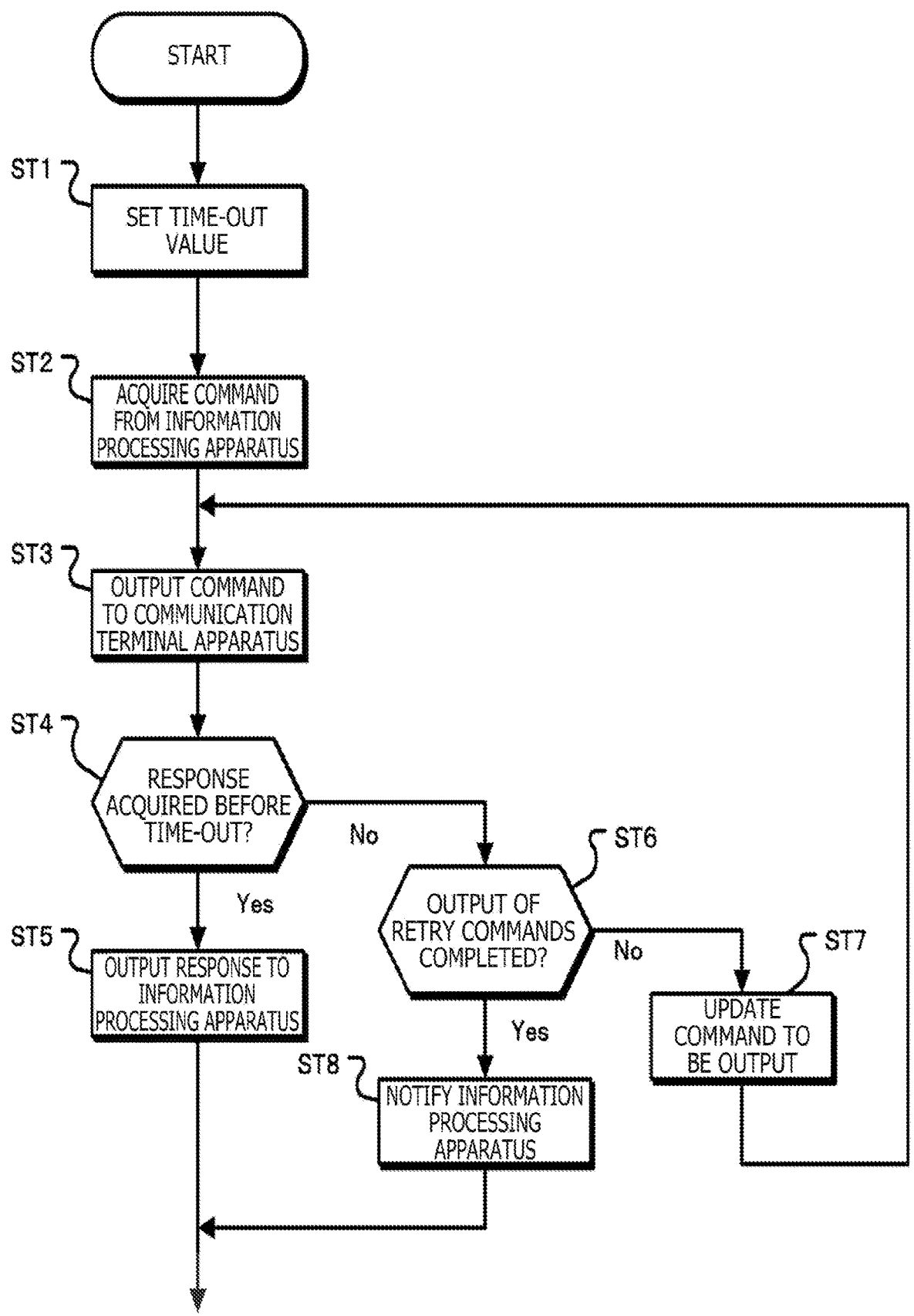
FIG. 6 is a flowchart exemplifying operation of the information processing terminal apparatus.

FIG. 6 is a flowchart exemplifying operation of the information processing terminal apparatus. In step ST1, the information processing terminal apparatus sets a time-out value. For example, the information processing terminal apparatus 30 performs polling for detecting a communication terminal apparatus 20 that can perform short-range wireless communication with the information processing terminal apparatus 30, sets, as the time-out value, maximum response time indicated by parameter information (for example, the manufacture parameter (PMm)) included in a polling response supplied from the communication terminal apparatus 20, and proceeds to step ST2. Note that the information processing terminal apparatus 30 outputs, to the information processing apparatus 40, card identification information (for example, manufacture IDm) included in the polling response.

In step ST2, the information processing terminal apparatus acquires a command from the information processing apparatus. In the information processing apparatus 40, a command to be output to the communication terminal apparatus 20 that can perform short-range wireless communication with the information processing terminal apparatus 30 and retry commands are generated on the basis of the card identification information and the like, and the information processing terminal apparatus 30 proceeds to step ST3 after acquiring the command and the retry commands that are output from the information processing apparatus 40.

In step ST3, the information processing terminal apparatus outputs a command to the communication terminal apparatus. The information processing terminal apparatus 30 outputs the command acquired in step ST2 or a retry command subsequently designated in step ST7 to the communication terminal apparatus 20 by short-range wireless communication, and proceeds to step ST4.

In step ST4, the information processing terminal apparatus determines whether a response has been acquired before time-out. The information processing terminal apparatus 30 proceeds to step ST5 in a case where a response has been acquired before the length of time that has elapsed from the output of the command in step ST2 becomes longer than the length of time represented by the time-out value, but proceeds to step ST6 in a case where a response has not been acquired before the former becomes longer than the latter.

In step ST5, the information processing terminal apparatus outputs a response to the information processing apparatus. The information processing terminal apparatus 30 outputs, to the information processing apparatus 40, the response supplied from the communication terminal apparatus 20.

Proceeding from step ST4 to step ST6, the information processing terminal apparatus determines whether output of retry commands is completed. In a case where the retry commands acquired in step ST2 include a retry command which has not been output to the communication terminal apparatus 20, the information processing terminal apparatus 30 proceeds to step ST7, and in a case where output of the acquired retry commands is completed, the information processing terminal apparatus 30 proceeds to step ST8.

In step ST7, the information processing terminal apparatus updates the command to be output. The information processing terminal apparatus 30 designates, as a command to be output to the communication terminal apparatus 20, a command which is among the retry commands acquired in step ST2, which has not been output to the communication terminal apparatus 20, and which is a retry command with a sequence number that is first in the order of processing, and returns to step ST3.

In step ST8, the information processing terminal apparatus gives notification to the information processing apparatus. The information processing terminal apparatus 30 notifies the information processing apparatus 40 that a response to the command acquired in step ST2 cannot be acquired. Note that, in a case where the information processing apparatus 40 determines that communication with the communication terminal apparatus 20 cannot be performed when a response has not been supplied even after a predetermined length of time has elapsed from the output of a command, the processing in step ST8 may not be provided.

Figure 7:
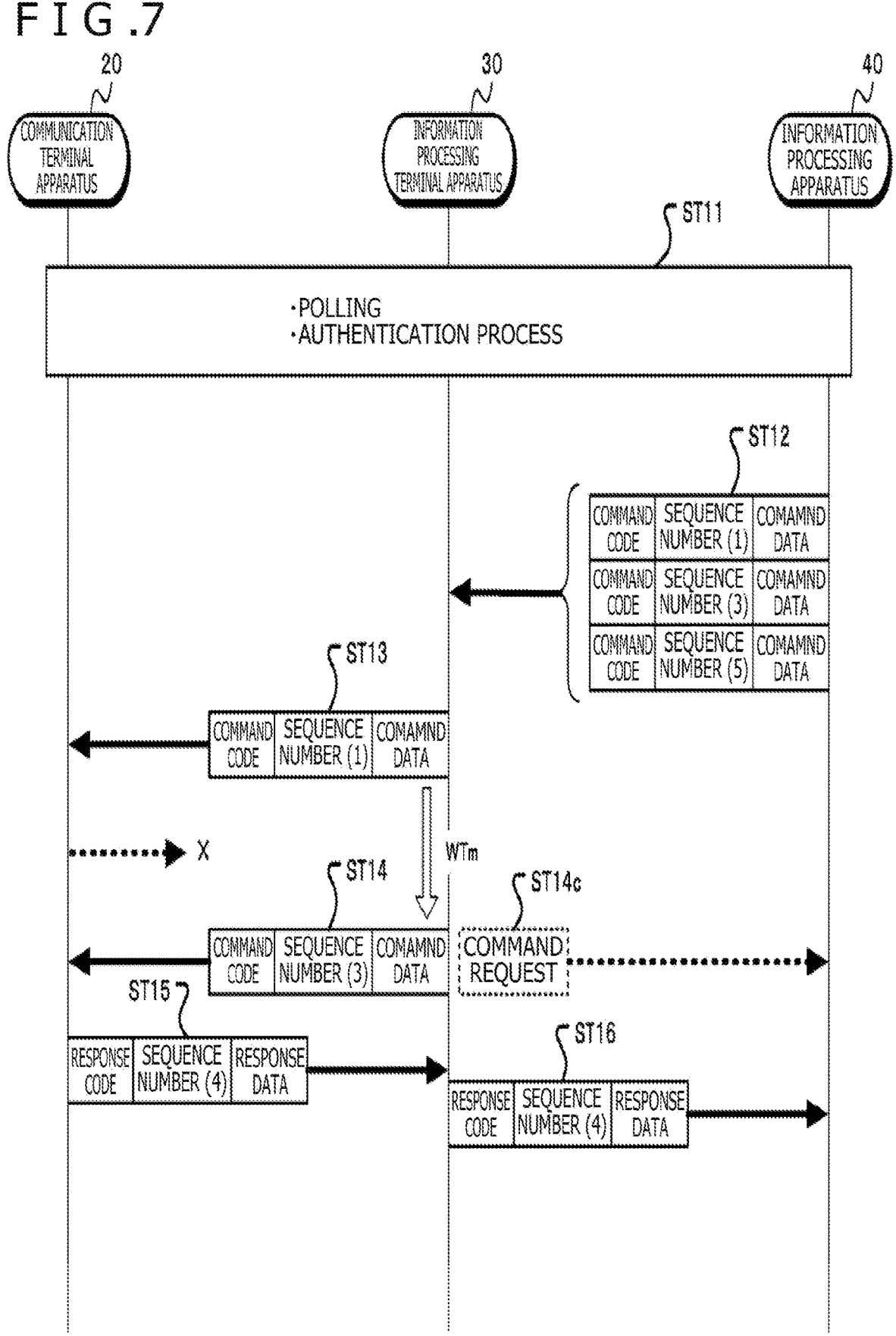
FIG. 7 is a sequence diagram illustrating an example of operation of the information processing system.

FIG. 7 is a sequence diagram illustrating an example of operation of the information processing system. In step ST11, the information processing system performs polling and an authentication process. The information processing terminal apparatus 30 performs polling for detecting a communication terminal apparatus 20 that can perform short-range wireless communication with the information processing terminal apparatus 30, and sets, as the time-out value, the maximum response time indicated by the parameter information (for example, the manufacture parameter (PMm)) included in the polling response supplied from the communication terminal apparatus 20. In addition, the information processing terminal apparatus 30 outputs, to the information processing apparatus 40, card identification information (for example, the manufacture IDm) included in the polling response. The information processing apparatus 40 performs the authentication process by using the card identification information supplied from the communication terminal apparatus 20.

In step ST12, the information processing apparatus 40 generates a command for the authenticated communication terminal apparatus 20 and outputs the command. The command to be output to the communication terminal apparatus 20 has a sequence number "1," and commands for a retry process that differ from the abovementioned command only in sequence number are generated. Note that, in FIG. 7, retry commands with the sequence numbers "3" and "5" are generated. The command with the sequence number "1" and the retry commands with the sequence numbers "3" and "5" are collectively output to the information processing terminal apparatus 30.

In step ST13, the information processing terminal apparatus 30 outputs the command with the sequence number "1" to the communication terminal apparatus 20.

In a case where the information processing terminal apparatus 30 cannot acquire a response even after a length of time represented by the time-out value has elapsed from the output of the command in step ST13, the information processing terminal apparatus 30 performs a retry process, and as indicated in step ST14, outputs a retry command to the communication terminal apparatus 20. In the retry process, a command which is among the retry commands acquired in step ST12, which has not been output to the communication terminal apparatus 20, and which is a retry command with a sequence number that is first in the order of processing, that is, the command with the sequence number "3" in step ST14, is output to the communication terminal apparatus 20.

When a response is supplied from the communication terminal apparatus 20 to the information processing terminal apparatus 30 in step ST15, the information processing terminal apparatus 30 outputs the acquired response to the information processing apparatus 40 as illustrated in step ST16. Since the sequence number of the command is incremented and used as the sequence number of the response, the response supplied in step ST15 has a sequence number "4."

Note that, in the conventional information processing system, the retry commands indicated in step ST2 are not supplied to the information processing terminal apparatus, and thus, in the retry process, a command request is made to the information processing apparatus 40 as illustrated in step ST14c, and thereafter, the command supplied from the information processing apparatus 40 is output to the communication terminal apparatus 20.

As described above, the information processing terminal apparatus 30 is supplied with the command to be output to the communication terminal apparatus 20 and the retry commands from the information processing apparatus, and is thus able to perform a retry process by using the retry commands that are supplied together with the command to be output to the communication terminal apparatus 20. Accordingly, in comparison to a conventional configuration in which a command request is made at the time of a retry process and the retry process is performed with use of the command supplied from the information processing apparatus 40, time required for the retry process can be shortened. Further, generating a command for a retry process at the time of generating a command to be transmitted to the communication terminal apparatus 20 and supplying the command for the retry process together with the command to be transmitted to the communication terminal apparatus 20 to the information processing terminal apparatus 30 enable efficient performance of the process of generating commands in the information processing apparatus 40 and the process of transmitting commands to the information processing terminal apparatus 30.

<3. Second Operation of Information Processing System>

Incidentally, as the command to be supplied from the information processing apparatus 40 to the communication terminal apparatus, not only a command with which an identical processing result will be obtained even if the command supplied is repeatedly processed, i.e., a command that has what is generally called idempotence (such a command is referred to as an "idempotent command" in the present technology), but also a command with which a different processing result will be obtained as a result of repetitively processing the command supplied, i.e., a command that does not have what is generally called idempotence (such a command is referred to as a "non-idempotent command" in the present technology), is used. Thus, if a non-idempotent command is repeated in the retry process, information indicated by a response may be different for each retry process.

FIG. 8 exemplifies idempotent commands and non-idempotent commands. The idempotent command, for example, a read command or a card state checking command, is a command used for reading out information stored in the communication terminal apparatus 20, and thus, even if the read command or the card state checking command is repeatedly processed, the same processing result will be obtained. Further, a write command for overwriting is a command used for overwriting information of the communication terminal apparatus 20 with new information, and thus, even if the write command is repeatedly processed, the same processing result will be obtained. In FIG. 8, (a) illustrates a case where read commands with the sequence numbers "3" and "5," which are retry commands, are output together with a read command with the sequence number "1."

On the other hand, the non-idempotent command, for example, a write command indicating subtraction, is a command used for subtracting a designated value from the value stored in the communication terminal apparatus 20, and thus, if the write command is repeatedly processed, sequentially decreased values will be obtained as the processing results.

As such, the command generation section 43 of the information processing apparatus 40 generates a retry command that is based on whether or not a command for the communication terminal apparatus 20 is a command that has idempotence. For example, in a case where an idempotent command is to be output to the communication terminal apparatus 20, the command generation section 43 generates, as the retry command, a command with only the sequence number being incremented, as described above. Further, in a case where a non-idempotent command is to be output to the communication terminal apparatus 20, the command generation section 43 generates, as the retry command, a command for checking a state of the communication terminal apparatus 20.

Further, in a case where the information processing apparatus 40 encrypts a packet of a command and the communication terminal apparatus 20 encrypts a packet of a response, the information processing terminal apparatus 30 is unable to determine whether a packet of a response corresponding to the command is supplied. Thus, in a case where a response to be output from the communication terminal apparatus in response to a command is to be encrypted, the command generation section 43 of the information processing apparatus 40 calculates an expected value of the response and outputs the calculated expected value together with the generated command and retry command. In addition, the information processing terminal apparatus 30 is enabled to determine whether the relevant response is a response to the command by using the acquired expected value. In FIG. 8, (b) illustrates a case where a read command with a sequence number "3" which is a retry command for checking the state of the communication terminal apparatus 20, an expected value (or a hash value of the expected value) of a response, and a write command with a sequence number "5" which is a retry command to be used in a case where the expected value (or the hash value of the expected value) of the response and an expected value (or a hash value of the expected value) of a response from the communication terminal apparatus 20 do not match with each other as described later are output together with a write command with a sequence number "1."

Figure 9:
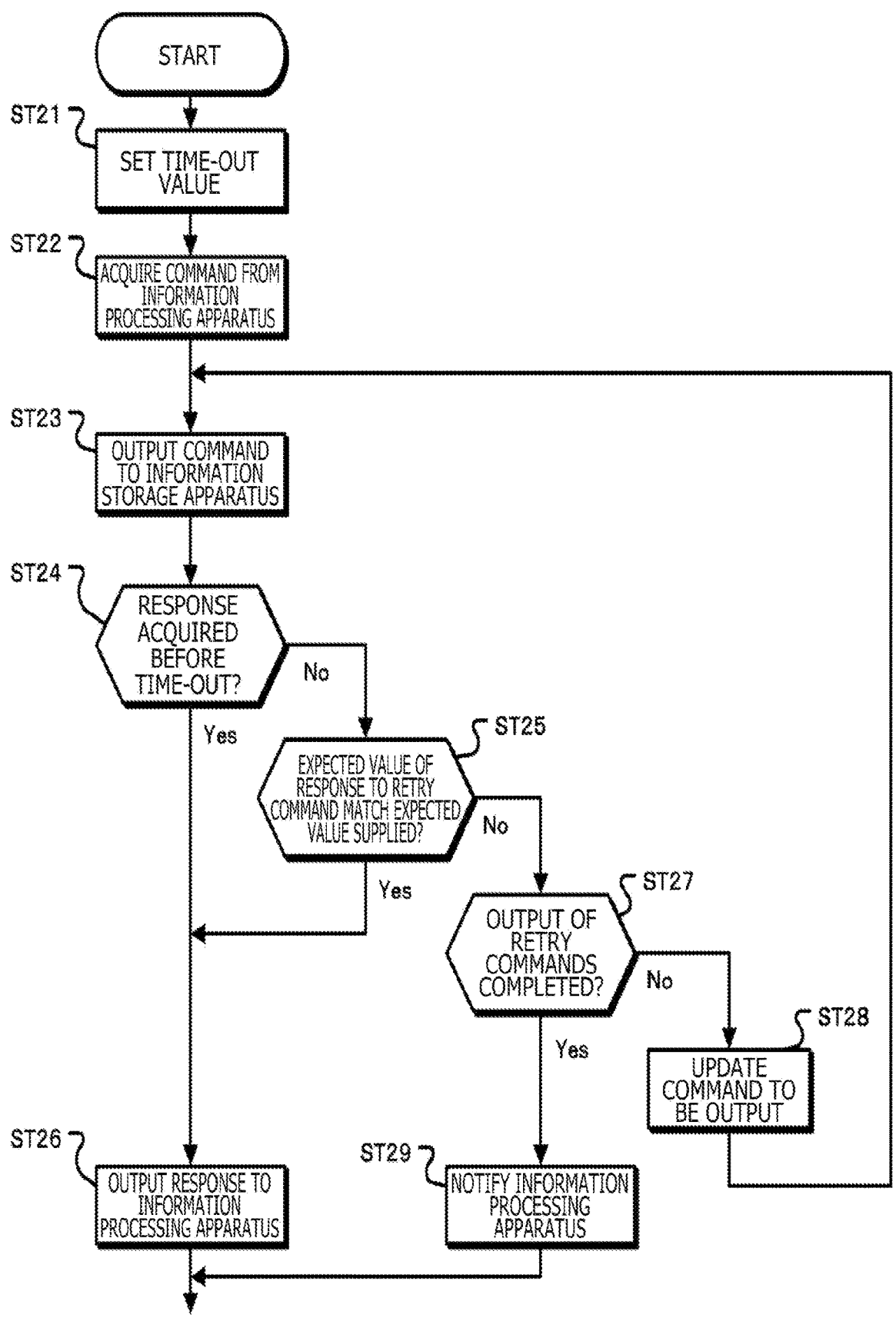
FIG. 9 is a flowchart exemplifying operation of the information processing terminal apparatus.

FIG. 9 is a flowchart exemplifying operation of the information processing terminal apparatus. In step ST21, the information processing terminal apparatus sets a time-out value. The information processing terminal apparatus 30 performs, for example, polling for detecting a communication terminal apparatus 20 that can perform short-range wireless communication with the information processing terminal apparatus 30, sets, as the time-out value, the maximum response time indicated by the parameter information (for example, the manufacture parameter (PMm)) included in the polling response supplied from the communication terminal apparatus 20, and then proceeds to step ST22. Note that, the information processing terminal apparatus 30 outputs, to the information processing apparatus 40, the card identification information (for example, the manufacture IDm) included in the polling response.

In step ST22, the information processing terminal apparatus acquires a command from the information processing apparatus. The information processing apparatus 40 generates a command to be output to the communication terminal apparatus 20 that can perform short-range wireless communication with the information processing terminal apparatus 30 and retry commands, on the basis of the card identification information and the like. The information processing terminal apparatus 30 acquires the command and the retry commands output from the information processing apparatus 40 or the command, the retry commands, and the expected value output from the information processing apparatus 40, and proceeds to step ST23.

In step ST23, the information processing terminal apparatus outputs a command to the communication terminal apparatus. The information processing terminal apparatus 30 outputs the command acquired in step ST22 or a retry command subsequently designated in step ST28 to the communication terminal apparatus 20 by short-range wireless communication, and proceeds to step ST24.

In step ST24, the information processing terminal apparatus determines whether a response has been acquired before time-out. The information processing terminal apparatus 30 proceeds to step ST25 in a case where a response has not been acquired before the length of time that has elapsed from the output of the command in step ST22 becomes longer than the length of time represented by the time-out value, but proceeds to step ST26 in a case where a response has been acquired before the former becomes longer than the latter.

In step ST25, the information processing terminal apparatus determines whether the expected value of a response to a retry command matches the expected value supplied from the information processing apparatus. The information processing terminal apparatus 30 calculates an expected value of the response supplied from the communication terminal apparatus 20 in response to a retry command and determines whether the calculated expected value matches the expected value supplied from the information processing apparatus 40. In a case where the expected values match, the information processing terminal apparatus 30 proceeds to step ST26, and in a case where the expected values do not match, the information processing terminal apparatus 30 proceeds to step ST27.

In step ST26, the information processing terminal apparatus outputs a response to the information processing apparatus. The information processing terminal apparatus 30 outputs, to the information processing apparatus 40, the response supplied from the communication terminal apparatus 20.

Proceeding from step ST25 to step ST27, the information processing terminal apparatus determines whether output of retry commands is completed. In a case where the retry commands acquired in step ST22 include a retry command which has not been output to the communication terminal apparatus 20, the information processing terminal apparatus 30 proceeds to step ST28, and in a case where output of retry commands is completed, the information processing terminal apparatus 30 proceeds to step ST29.

In step ST28, the information processing terminal apparatus updates the command to be output. The information processing terminal apparatus 30 designates, as a command to be output to the communication terminal apparatus 20, a command which is among the retry commands acquired in step ST22, which has not been output to the communication terminal apparatus 20, and which is a retry command with a sequence number that is first in the order of processing, and then returns to step ST23.

In step ST29, the information processing terminal apparatus gives notification to the information processing apparatus. The information processing terminal apparatus 30 notifies the information processing apparatus 40 that a response to the command acquired in step ST22 cannot be acquired. Note that, in a case where the information processing apparatus 40 determines that communication with the communication terminal apparatus 20 cannot be performed when a response has not been supplied even after a predetermined length of time has elapsed from the output of a command, the processing in step ST29 may not be provided.

Figure 10:
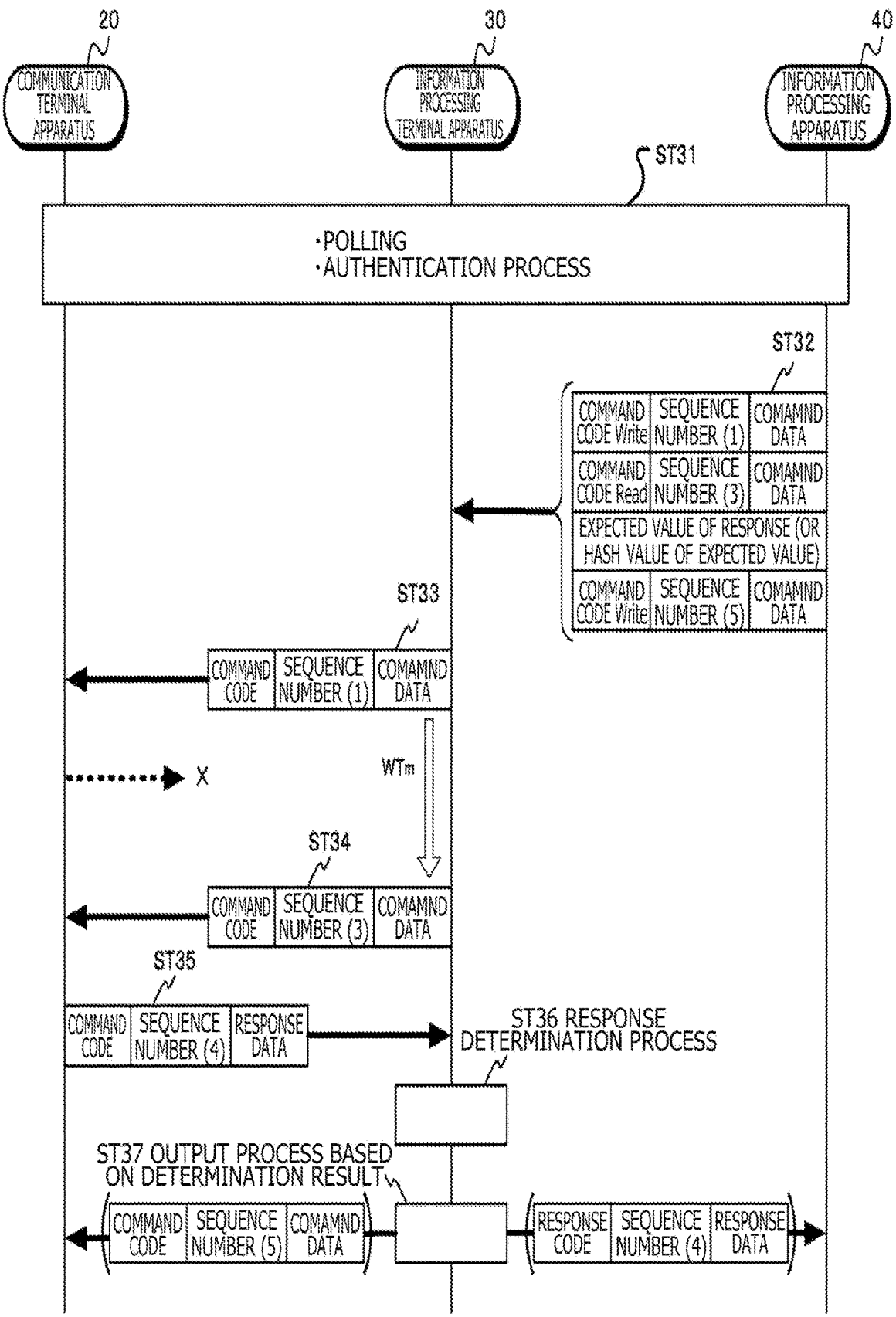
FIG. 10 is a sequence diagram illustrating an example of operation of the information processing system (in a case of a non-idempotent command).

FIG. 10 is a sequence diagram illustrating an example of operation of the information processing system. Note that, FIG. 10 illustrates a case where a non-idempotent command is output from the information processing apparatus 40.

In step ST31, the information processing system performs polling and an authentication process. The information processing terminal apparatus 30 performs polling for detecting a communication terminal apparatus 20 that can perform short-range wireless communication with the information processing terminal apparatus 30 and sets, as the time-out value, the maximum response time indicated by the parameter information (for example, the manufacture parameter (PMm)) included in the polling response supplied from the communication terminal apparatus 20. Further, the information processing terminal apparatus 30 outputs, to the information processing apparatus 40, the card identification information (for example, the manufacture IDm) included in the polling response. The information processing apparatus 40 performs the authentication process by using the card identification information supplied from the communication terminal apparatus 20.

In step ST32, the information processing apparatus 40 generates a command for the authenticated communication terminal apparatus 20 and outputs the command. The command to be output to the communication terminal apparatus 20 has a sequence number "1." Further, in a case where the command with the sequence number "1" is a non-idempotent command, a command for checking the state of the communication terminal apparatus 20 is used as a retry command, with the sequence number set to "3." Further, an expected value of a response is calculated, and a packet indicating the expected value of the response is output together with packets of the command and the retry command to the information processing terminal apparatus 30.

In step ST33, the information processing terminal apparatus 30 outputs the command with the sequence number "1" to the communication terminal apparatus 20.

In a case where the information processing terminal apparatus 30 cannot acquire a response even after a length of time represented by the time-out value has elapsed from the output of the command in step ST33, the information processing terminal apparatus 30 performs a retry process, and outputs a retry command to the communication terminal apparatus 20 as illustrated in step ST34. In the retry process, a command which is among the retry commands acquired in step ST32, which has not been output to the communication terminal apparatus 20, and which is a retry command with a sequence number that is first in the order of processing, that is, the command with the sequence number "3" in step ST34, is output to the communication terminal apparatus 20.

When a response is supplied from the communication terminal apparatus 20 to the information processing terminal apparatus 30 in step ST35, the information processing terminal apparatus 30 performs, in step ST36, a response determination process by using the acquired response. In the response determination process, the information processing terminal apparatus 30 compares an expected value calculated by using the acquired response and the expected value acquired in step ST32, and in a case where the values match, the information processing terminal apparatus 30 determines that the response is a response to the command output in step ST34, and in a case where the values do not match, the information processing terminal apparatus 30 determines that the state of the communication terminal apparatus 20 has not changed, that is, the command has not been processed.

In step ST37, the information processing terminal apparatus 30 outputs, to the information processing apparatus 40, the response determined in step ST36 as the response to the command output in step ST34. Further, in a case where the information processing terminal apparatus 30 determines in step ST36 that the command has not been processed, the information processing terminal apparatus 30 outputs a retry command with a sequence number "5" to the communication terminal apparatus 20.

As described above, by being supplied, from the information processing apparatus, with retry commands together with a command to be output to the communication terminal apparatus 20, the information processing terminal apparatus 30 can perform the retry process with use of the retry commands supplied together with the command to be output to the communication terminal apparatus 20. Thus, in comparison to the conventional configuration in which a command request is made at the time of a retry process and the retry process is performed with use of the command supplied from the information processing apparatus 40, time required for the retry process can be shortened. Further, generating a command for a retry process at the time of generating a command to be transmitted to the communication terminal apparatus 20 and supplying the command for the retry process together with the command to be transmitted to the communication terminal apparatus 20 to the information processing terminal apparatus 30 enable efficient performance of the process of generating commands in the information processing apparatus 40 and the process of transmitting commands to the information processing terminal apparatus 30.

Furthermore, in a case where a non-idempotent command is to be output to the communication terminal apparatus, a retry command for checking the state of the communication terminal apparatus 20 and an expected value of a response are output together with the command, and thus, the information processing terminal apparatus 30 is able to output, to the information processing apparatus, the response to the command output to the communication terminal apparatus.

<4. Other Operation of Information Processing System>

Incidentally, generating many retry commands makes it possible for the information processing apparatus 40 to increase the number of times of efficiently performing the retry process. However, in a case where a retry process is not to be performed, this results in generating many unnecessary retry commands, making it difficult for the information processing apparatus 40 to operate efficiently. As such, the information processing apparatus 40 may control the generation of retry commands, according to the number of times of repeating the retry process or the rate of occurrence of the retry process. For example, the command generation section 43 of the information processing apparatus 40 adjusts the number of retry commands according to the number of retries or a state of occurrence of retries. Further, the command generation section 43 determines the number of retries or the state of occurrence of retries on the basis of the sequence number of the command and the sequence number of the response output from the communication terminal apparatus 20.

Figure 11:
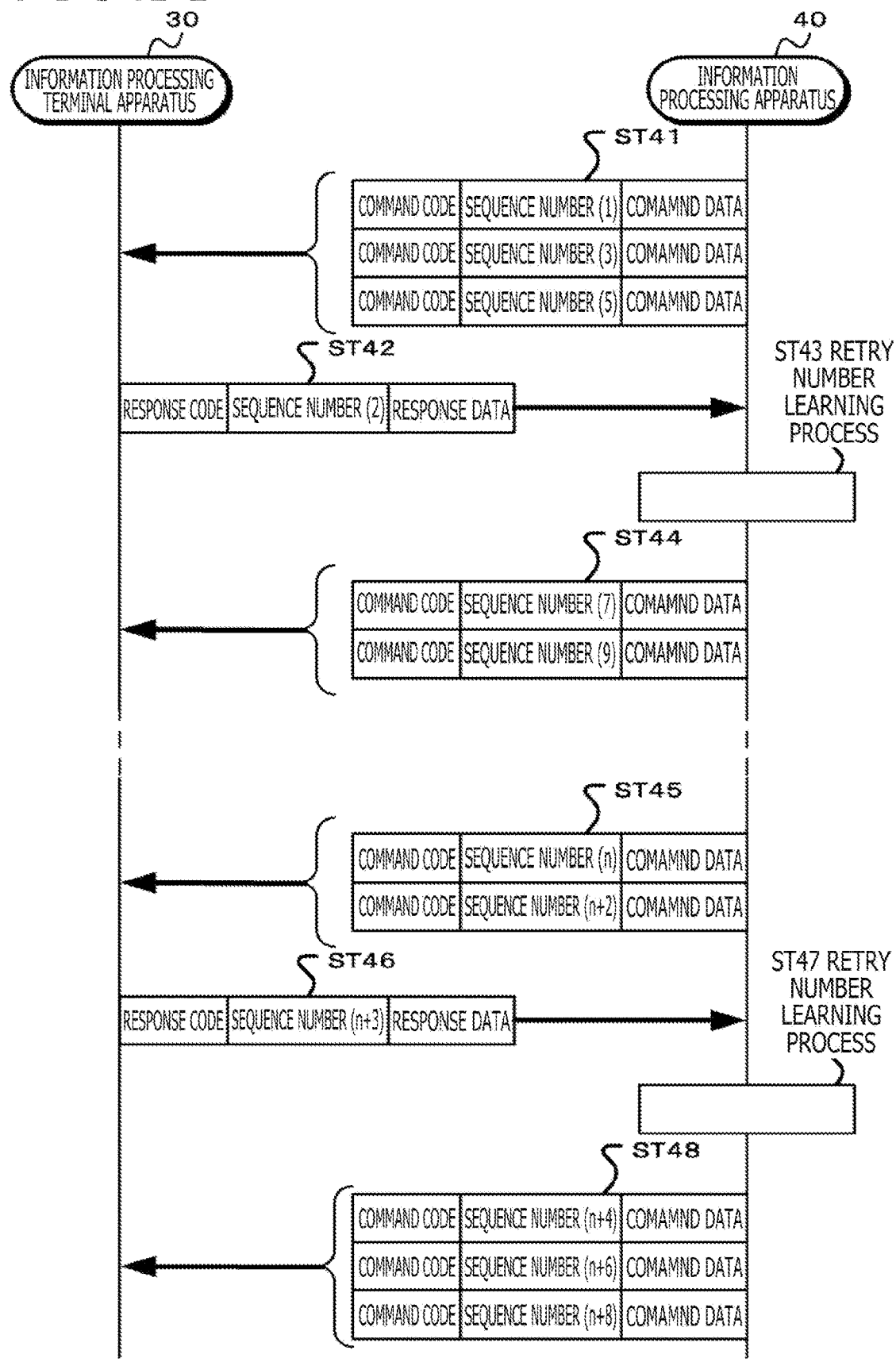
FIG. 11 is a sequence diagram exemplifying operation between the information processing apparatus and the information processing terminal apparatus.

FIG. 11 is a sequence diagram exemplifying operation between the information processing apparatus and the information processing terminal apparatus. In step ST41, the information processing apparatus 40 generates a command for the communication terminal apparatus 20 and outputs the command. The command to be output to the communication terminal apparatus 20 has a sequence number "1," and commands for a retry process that differ from the abovementioned command only in sequence number are generated. Note that, in FIG. 11, commands with the sequence numbers "3" and "5" are generated. The command with the sequence number "1" and the retry commands with the sequence numbers "3" and "5" are collectively output to the information processing terminal apparatus 30.

In step ST42, the information processing terminal apparatus 30 supplies, to the information processing apparatus 40, the response from the communication terminal apparatus 20.

In step ST43, the information processing apparatus performs a retry number learning process. The information processing apparatus 40 can determine that a retry process has not been performed, from the fact that the response has a sequence number "2." Thus, the information processing apparatus 40 determines that the communication between the communication terminal apparatus 20 and the information processing terminal apparatus 30 is performed favorably and generates only a small number of retry commands.

In step ST44, the information processing apparatus 40 generates a command for the communication terminal apparatus 20 and outputs the command. The command to be output to the communication terminal apparatus 20 has a sequence number "7," and a command for a retry process that differs from the abovementioned command only in sequence number is generated. Further, since the communication between the communication terminal apparatus 20 and the information processing terminal apparatus 30 is determined in step ST44 as being performed favorably, the number of retry commands to be generated is decreased, and the command with the sequence number "7" and a retry command with a sequence number "9" are output to the information processing terminal apparatus 30.

Thereafter, in step ST45, the information processing apparatus 40 outputs, to the information processing terminal apparatus 30, a command with a sequence number "n" that is to be output to the communication terminal apparatus 20 and a retry command with a sequence number "n+2," and in step ST46, the information processing terminal apparatus 30 supplies, to the information processing apparatus 40, the response from the communication terminal apparatus 20.

In step ST47, the information processing apparatus performs a retry number learning process. The information processing apparatus 40 can determine that the retry process has been performed once, from the facts that the sequence number of the command output to the immediately prior one is "n" and that the sequence number of the response is "n+3." Accordingly, the information processing apparatus 40 determines that the communication between the communication terminal apparatus 20 and the information processing terminal apparatus 30 is no longer performed favorably and generates a large number of retry commands.

In steps ST48, the information processing apparatus 40 generates a command for the communication terminal apparatus 20 and outputs the command. The command to be output to the communication terminal apparatus 20 has a sequence number "n+4," and commands for a retry process that differ from the abovementioned command only in sequence number are generated. Further, in step ST48, since it has been determined that the communication between the communication terminal apparatus 20 and the information processing terminal apparatus 30 is no longer performed favorably, the number of retry commands is increased, and the command with the sequence number "n+4" and retry commands with sequence numbers "n+6" and "n+8" are output to the information processing terminal apparatus 30.

Note that, in FIG. 11, generation of retry commands is controlled according to the number of retries, but the generation of retry commands may be controlled according to the rate of occurrence of retries. Specifically, in a case where the frequency of occurrence of retries is high, the number of retry commands may be increased, while, in a case where the frequency of occurrence of retries is low, the number of retry commands may be decreased.

As described above, controlling the generation of retry commands according to the number of retries or the rate of occurrence of retries makes it possible to generate retry commands in a number appropriate for the communication state in the short-range wireless communication performed between the communication terminal apparatus 20 and the information processing terminal apparatus 30.

The series of processes described in the specification can be performed by hardware, software, or a composite configuration of the two. In a case where the series of processes is to be performed by software, a program in which a processing sequence is recorded is executed by being installed in a memory of a computer incorporated in dedicated hardware. Alternatively, the program can be executed by being installed in a general-purpose computer capable of performing various processes.

For example, the program can be recorded in advance in a hard disk, an SSD (Solid State Drive), or a ROM (Read Only Memory) as a recording medium. Alternatively, the program may temporarily or permanently be stored (recorded) in a removable recording medium such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, and a semiconductor memory card. Such a removable recording medium may be provided as what is generally called package software.

Further, other than being installed into a computer from a removable recording medium, the program may be transferred to a computer in a wireless or wired manner, from a download site through such a network as a LAN (Local Area Network) or the internet. The computer receives the program being transferred in the manner described above and installs it in a recording medium such as a built-in hard disk.

Note that the advantageous effects described in the specification are illustrative to the last and not restrictive; additional advantageous effects that are not described may be provided. Further, the present technology should not be interpreted by being limited to the abovementioned embodiment of the present technology. The embodiment of the present technology has disclosed the present technology in the form of illustration. It is obvious that persons skilled in the art can make modifications and alterations to the embodiment within the scope not departing from the gist of the present technology. In other words, the claims should be taken into consideration in determining the gist of the present technology.

Further, the information processing apparatus according to the present technology can also take the following configurations.

(1)
An information processing apparatus including:
a command generation section configured to generate a command for a communication terminal apparatus and a retry command and output the generated retry command together with the command.

(2)
The information processing apparatus according to (1), in which
the command generation section generates the retry command that is based on whether or not the command for the communication terminal apparatus is a command that has idempotence.

(3)
The information processing apparatus according to (2), in which,
in a case where the command for the communication terminal apparatus is a command that has idempotence, the command generation section generates the retry command by changing a sequence number of the command that has idempotence.

(4)
The information processing apparatus according to (2) or (3), in which,
in a case where the command for the communication terminal apparatus is a command that does not have idempotence, the command generation section generates a command for checking a state of the communication terminal apparatus, as the retry command.

(5)
The information processing apparatus according to any one of (2) to (4), in which,
in a case where a response to be output from a communication terminal apparatus in response to the command is to be encrypted, the command generation section calculates an expected value of the response or a hash value of the expected value and outputs the calculated expected value or the calculated hash value of the expected value together with the generated command and the retry command.

(6)
The information processing apparatus according to any one of (1) to (5), in which
the command generation section sets a sequence number indicating an order of processing, for the command and the retry command.

(7)
The information processing apparatus according to (6), in which
the command generation section adjusts the number of retry commands according to the number of retries or a state of occurrence of retries.

(8)
The information processing apparatus according to (7), in which
the command generation section determines the number of retries or the state of occurrence of retries on the basis of the sequence number of the command and a sequence number of a response output from the communication terminal apparatus.

Furthermore, the information processing terminal apparatus according to the present technology can also take the following configurations.

(1)
An information processing terminal apparatus including:
a command control section configured to acquire a command for a communication terminal apparatus and a retry command that are output from an information processing apparatus, output the command acquired to the communication terminal apparatus, and output, in a retry process, the acquired retry command to the communication terminal apparatus.

(2)
The information processing terminal apparatus according to (1), further including:
a communication section configured to perform short-range wireless communication with the communication terminal apparatus, in which
the command control section outputs the command or the retry command through the communication section.

(3)
The information processing terminal apparatus according to (1) or (2), in which
the command control section outputs, to the information processing apparatus, a response output from the communication terminal apparatus.

(4)
The information processing terminal apparatus according to any one of (1) to (3), in which
the command control section acquires the command, the retry command, and an expected value of a response to the command or a hash value of the expected value, and outputs, in a case where the acquired expected value or the acquired hash value of the expected value matches an expected value or a hash value of the expected value that is based on a response output from the communication terminal apparatus, the response to the information processing apparatus.

REFERENCE SIGNS LIST

10: Information processing system
20: Communication terminal apparatus
21, 31: Communication section
21a, 31a: Antenna
21b, 31b: Modulation/demodulation section
22: Power supply section
23, 34, 42: Storage section
24, 44: Control section
30: Information processing terminal apparatus
32, 41: Network communication section
33: Input section
35: Command control section 40: Information processing apparatus
43: Command generation section
50: Network

The invention claimed is:

1. An information processing apparatus comprising:
a command generation section configured to generate a command for a communication terminal apparatus and a retry command and output the generated retry command together with the command, wherein
the command generation section generates the retry command that is based on whether or not the command for the communication terminal apparatus is a command that has idempotence, and
the command generation section is implemented via at least one processor.

2. The information processing apparatus according to claim 1, wherein,
in a case where the command for the communication terminal apparatus is a command that has idempotence, the command generation section is further configured to generate the retry command by changing a sequence number of the command that has idempotence.

3. The information processing apparatus according to claim 1, wherein,
in a case where the command for the communication terminal apparatus is a command that does not have idempotence, the command generation section is further configured to generate a command for checking a state of the communication terminal apparatus, as the retry command.

4. The information processing apparatus according to claim 1, wherein,
in a case where a response to be output from a communication terminal apparatus in response to the command is to be encrypted, the command generation section is further configured to
calculate an expected value of the response or a hash value of the expected value and
output the calculated expected value or the calculated hash value together with the generated command and the retry command.

5. The information processing apparatus according to claim 1, wherein
the command generation section is further configured to set a sequence number indicating an order of processing, for the command and the retry command.

6. The information processing apparatus according to claim 5, wherein
the command generation section is further configured to adjust a number of retry commands according to a number of retries or a state of occurrence of retries.

7. The information processing apparatus according to claim 6, wherein
the command generation section is further configured to determine the number of retries or the state of occurrence of retries on a basis of the sequence number of the command and a sequence number of a response output from the communication terminal apparatus.

8. An information processing method comprising:
generating a command for a communication terminal apparatus and a retry command and outputting, from a command generation section, the generated retry command together with the command, wherein
the retry command is based on whether or not the command for the communication terminal apparatus is a command that has idempotence.

9. An information processing terminal apparatus comprising:
a command control section configured to acquire a command for a communication terminal apparatus and a retry command that are output from an information processing apparatus, output the command acquired to the communication terminal apparatus, and output, in a retry process, the acquired retry command to the communication terminal apparatus, wherein
the retry command is generated based on whether or not the command for the communication terminal apparatus is a command that has idempotence, and
the command control section is implemented via at least one processor.

10. The information processing terminal apparatus according to claim 9, further comprising:
a communication section configured to perform short-range wireless communication with the communication terminal apparatus, wherein
the command control section is further configured to output the command or the retry command through the communication section, and
the communication section is implemented via at least one processor.

11. The information processing terminal apparatus according to claim 10, wherein
the command control section is further configured to output, to the information processing apparatus, a response output from the communication terminal apparatus.

12. The information processing terminal apparatus according to claim 10, wherein
the command control section is further configured to
acquire the command, the retry command, and an expected value of a response to the command or a hash value of the expected value, and
output, in a case where the acquired expected value or the acquired hash value of the expected value matches an expected value or a hash value of the expected value that is based on a response output from the communication terminal apparatus, the response to the information processing apparatus.

13. An information processing method comprising:
acquiring a command for a communication terminal apparatus and a retry command that are output from an information processing apparatus, outputting the command acquired to the communication terminal apparatus, and outputting, in a retry process, the acquired retry command to the communication terminal apparatus from a command control section,
wherein the retry command is generated based on whether or not the command for the communication terminal apparatus is a command that has idempotence.

* * * * *